April 23, 1940.   N. R. ANDERSON   2,198,192
EXPANSIBLE MEANS
Filed Sept. 1, 1937   2 Sheets-Sheet 1

Inventor:
N. R. Anderson
By Glascock Downing & Seebold
Attys.

April 23, 1940.    N. R. ANDERSON    2,198,192
EXPANSIBLE MEANS
Filed Sept. 1, 1937    2 Sheets-Sheet 2
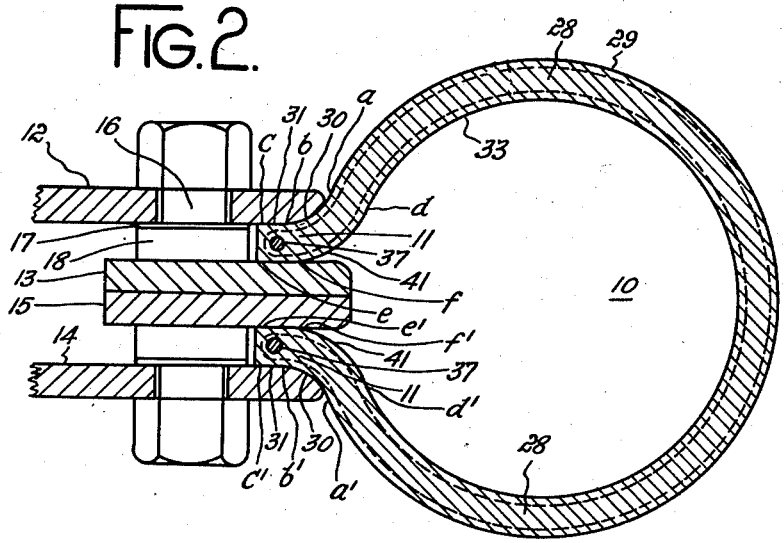
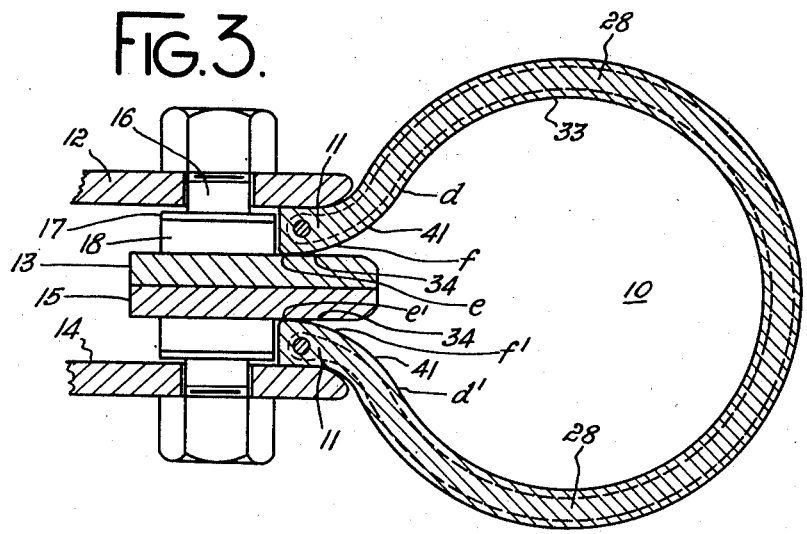
Inventor,
N. R. Anderson
By Glascock Downing & Seebold
Attys.

Patented Apr. 23, 1940

2,198,192

UNITED STATES PATENT OFFICE 2,198,192

EXPANSIBLE MEANS

Neville Rupert Anderson, Sydney, New South Wales, Australia

Application September 1, 1937, Serial No. 162,031
In Australia January 21, 1937

1 Claim. (Cl. 137—157)

This invention relates to improvements in power units of the type containing an expansible chamber comprising a diaphragm having outwardly convex side walls terminating in two annular and radially disposed marginal portions of substantially equal diameter secured to relatively reciprocable members with clamps whereby the diaphragm is retained in position and compressed to form a fluid-tight joint with each of the said members.

When power units of the above description are employed for exerting considerable force the diaphragms tend to crack or wear at or near the fluid-tight joints more readily than elsewhere due to the grip of the clamps forcing the stretching and flexing of the diaphragm to cease at or near the boundaries where the said walls meet the said joints.

The present invention provides a power unit having a novel combination of diaphragm and means of securing same whereby the said tendency to crack or wear is rendered negligible and the reliability and usefulness of a power unit of the above description substantially increased; the present invention provides an economically constructed and comparatively light power unit capable of exerting considerable force and having an expansible chamber wherein the fluid tightness of the chamber at joints between the diaphragm and the relatively reciprocable members is maintained, and the diaphragm retained in position, without the grip of the clamps preventing the diaphragm stretching and flexing at and near the said joints.

In order that the invention may be more readily understood reference will now be made to the accompanying drawings which illustrate the invention by way of example and wherein:

Fig. 2 is an enlarged view of portion of Fig. 1.

Fig. 3 is an enlarged view of portion of Fig. 1 prior to tightening up the clamping means.

Figure 1:
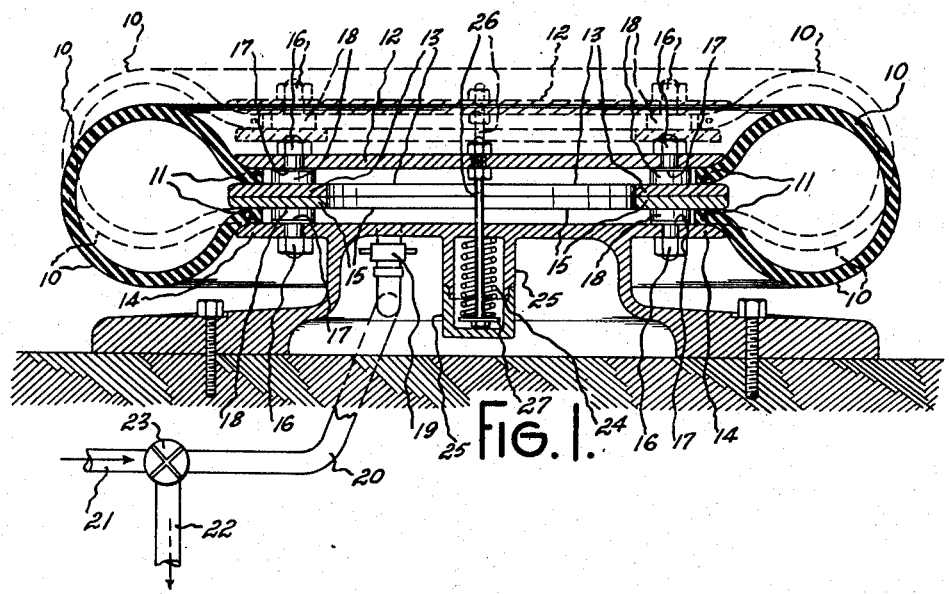
Fig. 1 is a sectional elevation through a power unit applied as a pushing mechanism.

In order that the invention may be clearly understood reference will first be made to Fig. 2 showing an enlarged view of the right hand side of Fig. 1. The diaphragm 10 has marginal portions 11 which have embedded therein wire bands 37 whereby the said marginal portions are rendered substantially non-stretchable and the flexibility of the said walls is decreased gradually as they approach the said marginal portions. The side walls 28 and marginal portions 11 of the diaphragm 10 are moulded together with flexible material such as rubber and form a self-retaining diaphragm, the marginal portions 11 being radially disposed with relationship to the central axis of the diaphragm as will be understood by reference to Fig. 1 wherein the rod 26 is situated on the said axis.

The term self-retaining diaphragm herein means a fluid-tight diaphragm which, when used as herein described, retains its moulded form without requiring to be forcibly restrained against stretching out of position by the parts engaging the marginal portions thereof.

As will be apparent from Fig. 2 the diaphragm 10 has outwardly convex side walls 28 the external surface 29 of which extends around the diaphragm from $a$ to $a'$ and terminate in concave fillets 30 extending from $a$ to $b$ and from $a'$ to $b'$ merging into the substantially flat outer faces 31 extending from $b$ to $c$ and from $b'$ to $c'$. The faces 31 are in planes substantially at right angles to the rods 26 and 35, illustrated in Figs. 1 and 4 respectively. From $b$ to $c$ and from $b'$ to $c'$ the inner faces of the relatively reciprocable members 12 and 13 are also in planes substantially at right angles to the said rods 26 and 35 and have peripheries rounded off to engage the fillets 30.

It will be seen that when fluid pressure is applied to the diaphragm 10 the said pressure on the internal surface 33 between $d$ and $f$ and between $d'$ and $f'$ forces the diaphragm against the members 12 and 14 and maintains fluid tightness at the joints between the said diaphragm and the said members independently of the clamps 13 and 15 in the form of rings or discs.

The internal surface 33 (see Fig. 3) of the side walls 28 of the diaphragm 10 is concave from $d$ to $d'$ and terminates in substantially convex shoulders 41 extending from $d$ to $e$ and $d'$ to $e'$, prior to tightening up the bolts 16. The inner flat faces 34 of the clamps 13 and 15 are in planes substantially at right angles to the rods 26 and 35 illustrated in Figs. 1 and 4 respectively. Referring now to Fig. 2 it will be seen that, when the bolts 16 have been tightened up the internal surface 33 of the diaphragm 10 is slightly flattened by compression over short distances from $e$ to $f$ and $e'$ to $f'$ and that such compression occurs in the vicinity of the wire bands 37, the said compression gradually increasing in a direction towards the points $e$ to $e'$ namely, towards the central axis of the diaphragm.

The said compression is so limited by the heads 18 and grummets 17 acting as distance pieces between the members 12 and 14 and the respective clamps 13 and 15 that the non-stretchable properties of the marginal portions of the diaphragm and not the grip of clamps on the said marginal portions, retains the said diaphragm 10 in position.

In this invention, the construction of the marginal portions gradually decreases the flexibility of the side walls near the said portions, fluid pressure within the diaphragm tends to maintain fluid-tightness at the joints, the diaphragm is self-retaining and the grip of the clamps is slight and graduated, the combined effect being that the diaphragm is retained in position and fluid-tight joints maintained without the grip of the clamps preventing the diaphragm from stretching and flexing at and near the said joints.

In Fig. 1, referred to as a power unit, the diaphragm 10 is shown secured in the manner already described with reference to Figs. 2 and 3, by its respective marginal portions 11 between a movable plate 12 and the ring shaped clamp 13, and a stationary member 14 and the ring shaped clamp 15 by means of bolts 16 provided with grummets 17 and heads 18 welded to the adjacent clamp 13 or 15 as the case may be, the said heads and grummets acting as distance pieces as already explained. The expansible fluid-tight chamber formed by the diaphragm 10 and the relatively reciprocable members 12 and 14 is capable of being inflated through the connection 19 which leads by a pipe 20 to inlet and discharge pipes 21 and 22 which are controlled by a suitable valve 23.

A coiled spring 24 is located in a cylindrical container 25 attached to the non-movable member 14 and a rod 26 is attached to the movable plate 12, the said rod 26 passing through the spring 24. A washer 27 is mounted on the rod 28 and serves to compress the spring 24 when pressure fluid is admitted through the pipe 20 to expand the diaphragm 10. When the pressure on the diaphragm 10 is relieved the spring 24 tends to return the said diaphragm 10 and the movable plate 12 to the contracted position.

In the contracted position and in the expanded position the marginal portions of the diaphragm are respectively closer together, and further apart than in the diaphragm prior to assembly of the power unit. The rod 26 maintains the members 12 and 14 in substantially parallel alignment and the fillets 30 or the heads 18 and grummets 17 acting as distance pieces therefor maintain the marginal portions 11 in substantially parallel alignment. The rod 26 prevents the chamber being over-expanded without the necessity of providing a heavy external structure for that purpose such as tie beams and guide bars.

The power unit shown in Fig. 1 is comparatively light, it has no external sliding parts, glands or the like and is capable of working in grit laden atmosphere or, for instance, when immersed in quicksand.

Figure 4:
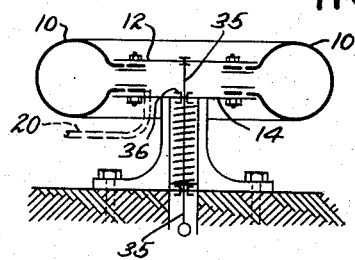
Fig. 4 is a diagrammatic sectional elevation through a power unit applied as a pulling mechanism.

In Figure 4 an example of the power unit is shown for use in exerting a pull instead of a thrust. In this case the pull rod 35 is fixed to the movable plate 12 and passes through a gland 36 in the non-movable plate 14.

I claim:

In a power unit, a self-retaining flexible annular diaphragm including a body portion substantially circular in cross section and spaced flange-like portions connected with said body portion and extending toward the center of the annular diaphragm, substantially non-stretchable wire reinforcements in said flange-like portions, relative reciprocable members engaging the outer surfaces of the flange-like portions, clamping members engaging the inner surfaces of said flange-like portions, bolts connecting the reciprocable members with the clamping members to clamp the flange-like portions therebetween, the adjacent surfaces of the reciprocating and clamping members engaged with the outer and inner surfaces of the flange-like portions being flat and disposed in parallel relation to accommodate free flexing movement of the body portion of the diaphragm through a wide range, and distance pieces removed inwardly of said flange-like portions and disposed between said reciprocating and clamping members.

NEVILLE RUPERT ANDERSON.